United States Patent [19]

Bradley

[11] 4,034,920

[45] July 12, 1977

[54] BALE FEEDER DEVICE

[75] Inventor: Richard S. Bradley, Fairmont, Minn.

[73] Assignee: Arts-Way Manufacturing Co., Armstrong, Iowa

[21] Appl. No.: 666,474

[22] Filed: Mar. 12, 1976

[51] Int. Cl.² ............................. B02C 13/286
[52] U.S. Cl. ................. 241/101.7; 241/186 R; 241/200
[58] Field of Search ........ 241/101 A, 101.7, 186 R, 241/186.2, 186.4, 200, 223; 214/519

[56] References Cited

U.S. PATENT DOCUMENTS

| | | | |
|---|---|---|---|
| 2,702,711 | 2/1955 | Purcell | 241/101.7 |
| 2,750,059 | 6/1956 | Hintz et al. | 214/519 |
| 2,771,203 | 11/1956 | Collins et al. | 241/200 UX |
| 3,209,803 | 10/1965 | Feterl | 241/200 |
| 3,436,028 | 4/1969 | Koehnen | 241/186.4 |
| 3,863,850 | 2/1975 | Freeman | 241/101.7 X |
| 3,933,314 | 1/1976 | Luscombe | 241/101.7 X |

FOREIGN PATENT DOCUMENTS 528,821  8/1956  Canada .............................. 241/200

*Primary Examiner*—Roy Lake
*Assistant Examiner*—Howard N. Goldberg
*Attorney, Agent, or Firm*—Williamson, Bains, Moore & Hansen

[57] ABSTRACT

A bale feeder device for a mixer grinder vehicle includes an elongate conveyor and table structure which is mounted on the mixer grinder vehicle chassis. The conveyor and table structure may be positioned to discharge slabs of hay into the hammer mill of the mixer grinder vehicle to permit the hay to be chopped or ground into small pieces. A feed chute positions the hay bale on the conveyor and table structure to permit conveyor chains having teeth thereon to rip away portions of the bale. A slab feeder roll cooperates with the conveyor chains to convey the slabs of hay along the table where the hay is directed to the hammer mill by feed rolls.

6 Claims, 5 Drawing Figures

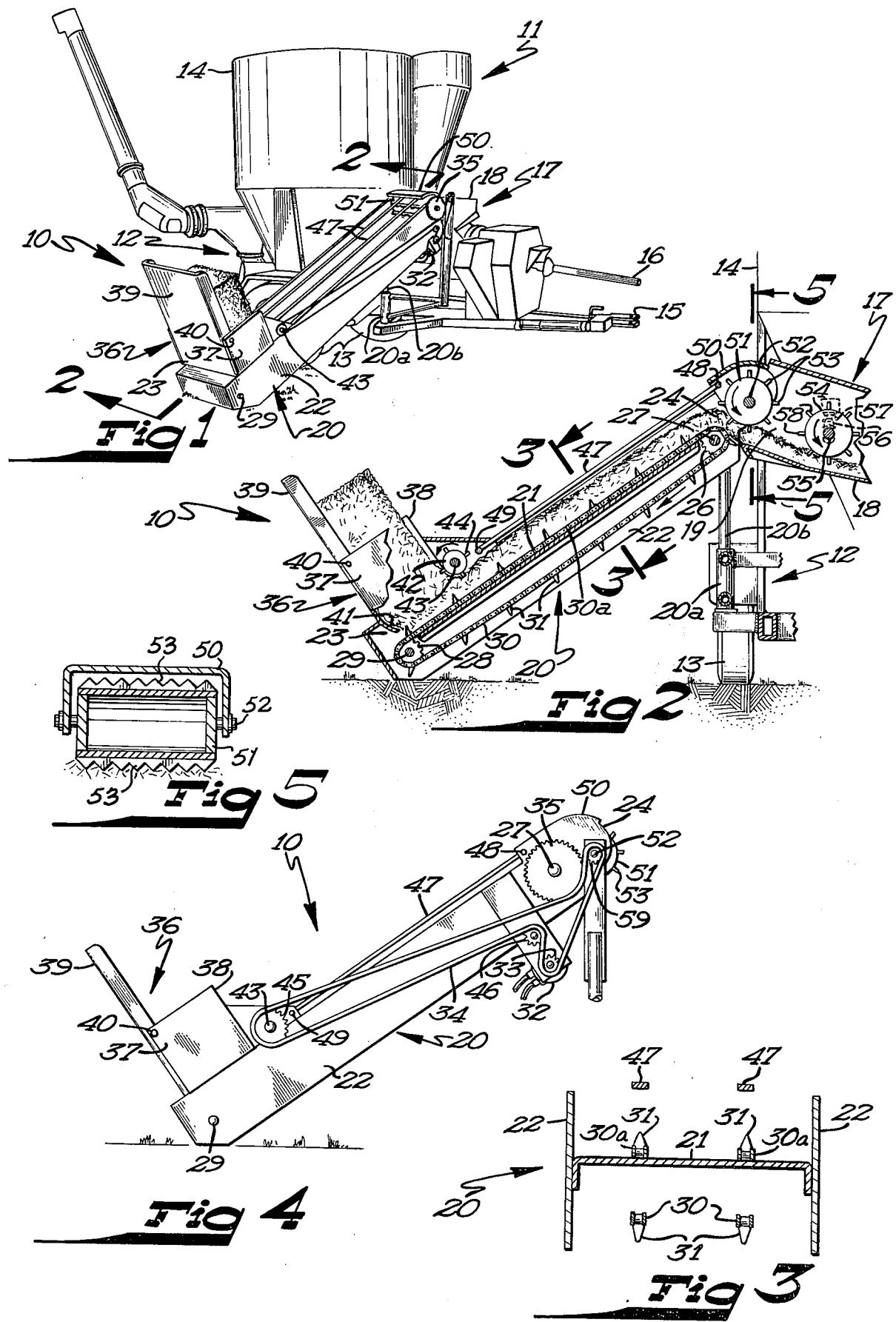

BALE FEEDER DEVICE

SUMMARY OF THE INVENTION

This invention relates to a bale feeder device for use with a mixer grinder vehicle of the type used in mixing and preparing feed for cattle and livestock.

When mixer grinder vehicles are used in the preparation of cattle feed, quite often some of the food components are processed through the conventional hammer mill mounted on the vehicle to reduce the size of the food particles prior to mixing in the mixing tank. Baled hay is often used in preparing the cattle ration but it is necessary to separate the hay from its baled condition so that it may be processed through the hammer mill. Some devices have been developed for separating the hay from is baled condition and for feeding the hay into the mixer grinder hammer mill. Some of these prior art devices involve the use of rotating blades as a means of separating the hay from the bale and directing the hay into a hammer mill. Devices using rotating blades while providing a means for rapidly feeding the hay into the hammer mill are quite dangerous.

It is therefore a general object of this invention to provide a mixer grinder vehicle with a novel bale feeder device, which is not only efficient in feeding hay from a bale into the hammer mill of the vehicle, but the bale feeder device is arranged and constructed so as to minimize any occurrence of injury to an operator during the operation of the device.

In this respect, the bale feeder device includes an elongate conveyor and table structure which may be readily mounted on the vehicle chassis and which includes endless chain conveyors and feed rolls for effectively removing and directing hay from a bale into the hammer mill. When the bale feeder device is not in use, it may be readily swung to an out of the way position and is supported entirely on the vehicle chassis.

These and other objects and advantages of this invention will more fully appear from the following description made in connection with the accompanying drawings wherein like reference characters refer to the same or similar parts throughout the several views.

FIGURES OF THE DRAWINGS

FIG. 1 is a perspective view of a grinder mixer vehicle having the novel bale feeder device mounted thereon;

FIG. 2 is an enlarged side view, partly in elevation and partly in section, of a bale feeder device illustrated in the operative position and;

FIG. 3 is a cross-sectional view taken approximately along line 3—3 of FIG. 2 and looking in the direction of the arrows.

FIG. 4 is a side elevational view of the bale feeder device.

FIG. 5 is a cross-sectional view taken approximately along line 5—5 of FIG. 2 and looking in the direction of the arrows.

DESCRIPTION OF THE PREFERRED EMBODIMENT OF THE INVENTION

Referring now to the drawings and more specifically to FIG. 1, it will be seen that the novel hay bale feeder device, designated generally by the reference numeral 10, is shown mounted on the grinder mixer vehicle 11. The grinder mixer vehicle 11 includes a chassis 12 having round engaging wheels 13 and having a mixing tank 14 mounted thereon. The chassis 12 is provided with a hitch 15 for connection to a prime mover such as the tractor or the like, and the vehicle is also provided with a power take off shaft 16 for connection to the power take off of the tractor. The grinder mixer vehicle 11 is also provided with a hammer mill 17 including a hammer mill housing 18 having an inlet 19 through which material is directed for grinding by the hammer mill.

The hay bale feeder device 10 includes an elongate conveyor and table structure 20 which is comprised of an elongate substantially flat table 21 having vertically disposed rigid side panels 22 fixedly connected thereto and extending vertically therefrom. It will be noted that the side panels 22 extend both above and below the table 21. The table 21 is provided with a material receiving end portion 23 and a discharge end portion 24 the latter being positioned closely adjacent the inlet 19 of the hammer mill housing when the hay bale feeder device is positioned in an operative position.

In this respect, the conveyor and table structure 20 is fixedly mounted on the chassis 12 of the vehicle 11 by means of a sleave 20A connected to the chassis, and a post 20B connected to one end of the conveyor and table structure 20. It will be noted that the sleave 20A and post 20B are vertically disposed and permit the conveyor and table structure to be swung about a vertical axis between an inoperative position and an operative position. It will be noted that when the conveyor and table structure 20 is disposed in an operative position, as shown in full line configuration of FIG. 1, but may be swung to an inoperative position where the conveyor and table structure is supported upon the chassis of the vehicle and extends longitudinally thereon. When the conveyor and table structure is disposed in the operative position, the discharge end of the table is positioned adjacent the inlet of the hammer mill housing, and the conveyor and table structure has its other end positioned upon the ground.

Drive sprockets 26 are provided adjacent the discharge end of the table and are secured to an axle 27 which is journaled in suitable bearings carried by the side panels 22. Driven sprockets 28 are provided adjacent the material receiving end of the table 21 and are fixedly mounted on an axle 29 which is also journaled in the side panels 22. Endless conveyor chains 30 are chained about the drive and driven pairs of sprockets, as best seen in FIG. 2. It will be noted that the sprockets 26 and the sprockets 28 project through slots in the table so that the upper run 30a of each chain is positioned upon the surface of the table. The chains 30 are each provided with a plurality of lugs or teeth 31 which project therefrom, these lugs or teeth being longitudinally spaced apart and projecting upwardly from the upper run of the conveyor.

Means are provided for driving the endless conveyor chains 30 and, to this end, a hydraulic motor 32 is provided and is mounted on one of the side panels 22. The hydraulic motor is connected by suitable conduits to a source of hydraulic pressure and the output shaft is provided with a drive sprocket 33. An endless chain 34 is trained about the sprocket 33 and is also chained about a sprocket 35 secured to the axle 27. Thus when the hydraulic motor 32 is energized, the drive sprocket 26 will be driven to thereby drive the conveyor chains 30.

Means are also provided for positioning and holding a bale of hay at the material receiving end portion of the table in a position so that the hay may be forceably pulled from the bale. This means includes a chute 36 having side walls 37 secured to the side panels 22 and projecting upwardly therefrom. A front wall 38 extends between and is rigidly secured to the side walls 37 of the chute 36. A rearwall 39 is positioned between the side walls 37 and is pivotally connected thereto by a pivot 40 to permit pivoting of the rear wall in a fore and aft direction about the horizontal transverse fixed axis. Normally, the rear wall 39 will be disposed in the position illustrated in FIG. 2 but may be pivoted forward to extend generally longitudinally on the table when the hay baler device is not being used. It will be noted that the side walls 37 and front wall 38 are substantially shorter than the rear wall 39 and substantially shorter than the hay bale H. It will also be noted that the rear wall 39 has a length or height dimension substantially greater than the hay bale H.

The cross-sectional size of the chute is slightly larger than the cross-sectional size of the hay bale H to thereby permit a bale of hay to be supported in the chute with one end thereof disposed downwardly towards or against the upper surface of the table 21. It will be seen that when a hay bale is so positioned in the chute 36, the conveyor mechanism will forceably rip portions or slabs of hay from the end of the bale and will move the slabs of the hay in an upward direction along the table 21.

Means are also provided for preventing the conveyor from overfeeding the hammer mill and to this end, an arcuate guide panel 41 is positioned within and is rigidly secured to the interior surface of the chute 36 adjacent the rear portion thereof. This guide panel actually engages the rear edge of the hay bale and prevents the teeth or lugs 31 of the chain conveyors from engaging and forceably removing hay from this rear edge portion. Thus the amount of hay being continuously fed upwards along the table 21 is controlled.

Means are also provided for assuring continuous feeding of the slabs of hay upwardly along the table and this means includes a slab feeder roll 42 which is positioned above the upper surface of the table and which is provided with an axle 43 journaled in the side panels 22 just forwardly of the chute 36. The slab feeder roll 42 is of cylindrical configuration but is provided with a plurality of longitudinally extending elongate serated blades 44 which project radially outwardly therefrom. One end of the axle 43 is provided with a sprocket 45 which is connected by a drive chain 34 to the sprocket 33. The slab feeder roll is rotated in a direction to impel or urge the slabs of hay continuously in an upward direction. The slab feeder roll 42 cooperates with the chain conveyors to assure a continuous flow of hay material upwardly along the table 21.

Elongate guide bars 47 are positioned above the table 21 and extend longitudinally thereof, the guide bars being fixedly connected at their front end to a transverse bar 48 and at their respective rear ends to a transverse bar 49. It will be noted that the transverse bars 48 and 49 extend between and are rigidly secured to the side panels 22. These guide bars prevent hay from spilling outwardly over the side panels of the table and guide the movement of the slabs of hay towards the discharge end of the table. It will be noted that the forward end of the bars 47 extend below an arcuate guide plate 50 which extends between the side panels 22 adjacent the upper end of the table.

The hay bale feeder device 10 also includes a feed roll 51 which is positioned forwardly of the conveyor chains 30 and adjacent the discharge end of the table 21. It will be noted that the feed roll 51 is provided with an axle 52 that extends between and is journaled in the side panels 22. The feed roll is also provided with a plurality of longitudinally extending elongate serated blades 53 which are affixed thereto and project radially outwardly therefrom. Blades on the slab feeder roll 42 and on the feed roll 51 facilitate positive movement of the hay minimizing any tendency of the hay to wrap around the roll. It will be noted that the under passing arc of rotation of the feed roll 51 is just forwardly of the conveyor chains 30 so that a cooperative action is produced between the conveyor chains and the feed roll 51 to impel the stream of hay towards the inlet of the hammer mill housing.

A second feed roll 54 is also provided and is located forwardly of or downstream of the feed roll 51. The feed roll 54 is provided with an axle 55 which projects through slots 56 in the side panels 22. The slots are vertically disposed and the axle 55 is engaged by suitable springs 57 which normally urge the feed roller downwardly while permitting upward yielding movement of the feed roll. The feed roll 54 is also provided with serated blades 58 which extend longitudinally of the rolls and which project radially outwardly therefrom. It will be noted that the feed roll 51 and feed roll 54 are of substantially the same size and are actually disposed in close proximity with respect to each other. On the other hand, the slab feeder roll 42 is substantially smaller than the feed rolls 51 and 54 and is located at the lower end of the conveyor and table structure 20. It is pointed out that the axle 55 of the feed roll 54 is provided with a suitable drive sprocket having a drive chain trained thereover and operatively connected to the hydraulic motor 32 so that when the motor is energized, the slab feeder roll 42 will be driven along with the feed roll 51, the feed roll 54 and the chain conveyors.

During the operation of the hay bale feeder device 10, the hay bale H will be positioned in the chute 36 so that one end of the bale is positioned adjacent the table 21. The hydraulic motor or other power source will be energized to drive the conveyor chains 30, the slab feeder roll 42, feed roll 51 and feed roll 54. The lugs or teeth 31 of the conveyor chain 30 will rip into the end portion of the bale and continuously remove the slabs of hay therefrom and impel the slabs along the table 21. The slab feeder roll 42 will be revolved and cooperate with the conveyor chains 30 and the associated lugs 31 to continuously move the hay upwardly along the table from the material receiving towards the discharge end. The guide bars 47 will prevent hay from being conveyed over the side panels 22. The feed roll 51 will be driven by a sprocket 59 and chain 34 in a direction to cause the hay to be directed towards the feed roll 54, the latter impelling the hay into the inlet of the hammer mill housing 18. Since the feed roll 54 can yield vertically, this feature minimizes the jamming of the feed roll due to an uneven supply of hay thereto. The guide panel 41 prevents the rear edge portion of the bale from being engaged by the lugs and thereby controls the amount of hay that is delivered along the table by the conveyor chains 30 and the slab feeder roll 42.

The hay will be directed into the hammer mill and the strands of hay will be chopped into relatively small pieces and will thereafter be directed by suitable conveyor means to the mixing tank 14.

It will be seen that by utilizing endless conveyor chains along with feed rolls, there is little, if any, chance of injury from operation of these components. The present hay bale feeder device does not use any rotating knives but the particular arrangement of the chute and conveyor chains along with the slab feeder roll assures continuous and positive feeding of hay from the bale into the hammer mill.

Thus it will be seen that I have provided a novel hay bale feeder device which is not only of simple and inexpensive construction, but one which functions in a more efficient manner than any heretofore and known comparable device.

I claim:

1. A bale feeder device for use with a grinder mixer apparatus having a mobile chassis and having a mixing tank and a hammer mill mounted on said chassis, said device including:

an elongate substantially flat table structure having a material receiving end and having a discharge end, means swingably mounting said bale feed device on said chassis for swinging movement between an operative position and an inoperative position, said table structure when in the operative position projecting outwardly from the chassis and having its discharge end positioned adjacent the inlet of the hammer mill, and said table structure when in the inoperative position being supported upon the chassis, an elongate endless conveyor mechanism mounted on said table and extending longitudinally thereof and having bale engaging elements thereon for engaging a bale of hay to continuously forceably rip slab portions of hay from the bale, a feed chute mounted on said table structure adjacent said material receiving end and projecting upwardly therefrom, said feed chute having a cross-sectional size slightly larger than the cross section of a bale of hay and receiving a bale of hay therein to position the bale of hay so that one end of the latter is disposed closely adjacent the table structure, a driven slab feeder roll mounted on said table structure closely adjacent and forwardly of said feed chute and being positioned above said conveyor, said slab feeder roll cooperating with said conveyor mechanism to cause slab portions of hay to be conveyed toward said discharge end, a feed roller mounted on the table structure adjacent the discharge end and cooperating with said conveyor mechanism to cause the slabs of hay material to be impelled into the hammer mill.

2. The bale feeder device as defined in claim 1 wherein said conveyor mechanism includes a plurality of endless conveyor chains; said bale engaging elements including lugs affixed to said conveyor chains and projecting therefrom, the upper run of each conveyor chain being positioned closely adjacent the upper surface of the table structure whereby said lugs project upwardly from the upper run of the associated conveyor chain.

3. The bale feeder device as defined in claim 1 wherein said slab feeder roll and said feed roller each having elongate serrated blades affixed thereto and projecting outwardly therefrom.

4. The bale feeder device as defined in claim 1 wherein said feed chute is of generally rectangular configuration including sidewalls, front and rear walls, said rear wall to be pivoted from an upright bale supporting position to a collapsed position.

5. The bale feeder device as defined in claim 1 and a plurality of elongate guide bars positioned above the upper surface of said table structure and preventing hay material from spilling from said table structure.

6. The bale feeder device as defined in claim 1 and a panel affixed to the interior of said chute and projecting forwardly therefrom and serving to space the lower rear edge of a hay bale from said chain conveyors.

* * * * *